(No Model.)

K. JACKMAN.
CHECK ROW CORN PLANTER AND DRILL ATTACHMENT.

No. 351,448. Patented Oct. 26, 1886.

Witnesses,
Saml. B. Dover.
G. G. Jackson.

Inventor.
Kendall Jackman
By Francis W. Parker,
Att'y

UNITED STATES PATENT OFFICE.

KENDALL JACKMAN, OF GENOA, ILLINOIS.

CHECK-ROW CORN-PLANTER AND DRILL ATTACHMENT.

SPECIFICATION forming part of Letters Patent No. 351,448, dated October 26, 1886.

Application filed August 28, 1886. Serial No. 212,053. (No model.)

*To all whom it may concern:*

Be it known that I, KENDALL JACKMAN, a citizen of the United States, residing at Genoa, in the county of De Kalb and State of Illinois, have invented certain new and useful Improvements in Check-Row Corn-Planters and Drill Attachments, which are fully set forth in the following specification, reference being had to the accompanying drawings, forming a part thereof.

My invention relates to corn-planters, drills, seeders, and the like, and has for its object to provide means whereby the operator may be able to distinguish from time to time the transverse rows, and then to know whether the planter is working accurately, and to provide a simple and convenient device for operating the dropping mechanism. These objects I attain by the mechanism illustrated in the accompanying drawings, wherein—

Figure 1:
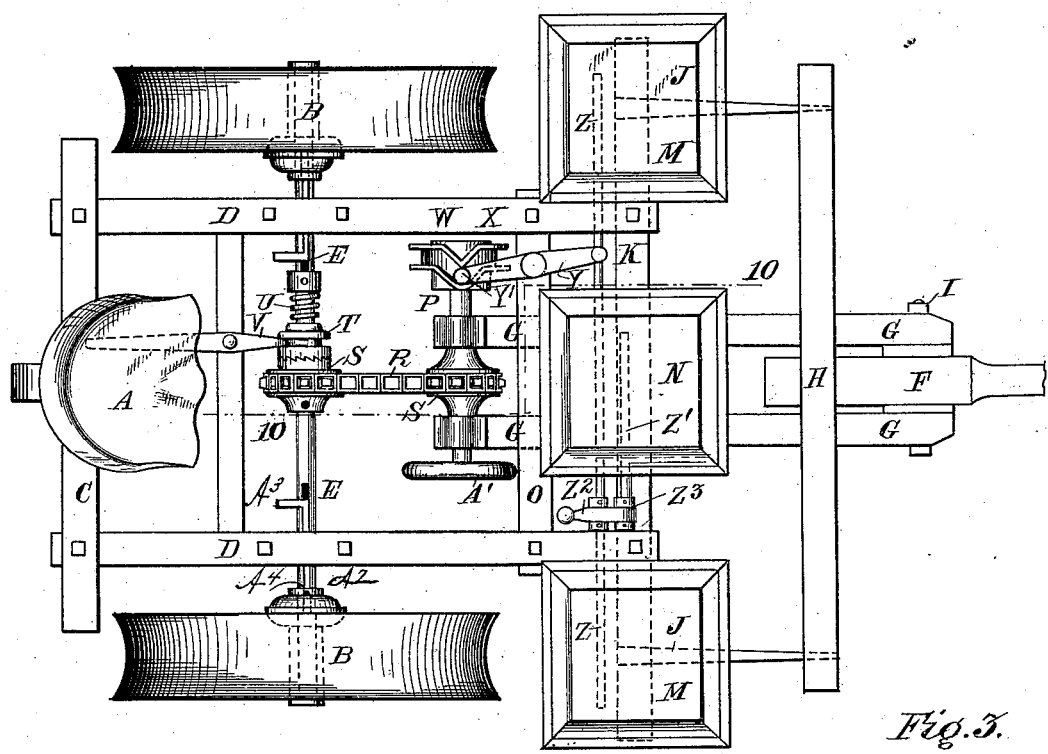
Figure 3:
Figure 4:
Figure 2:
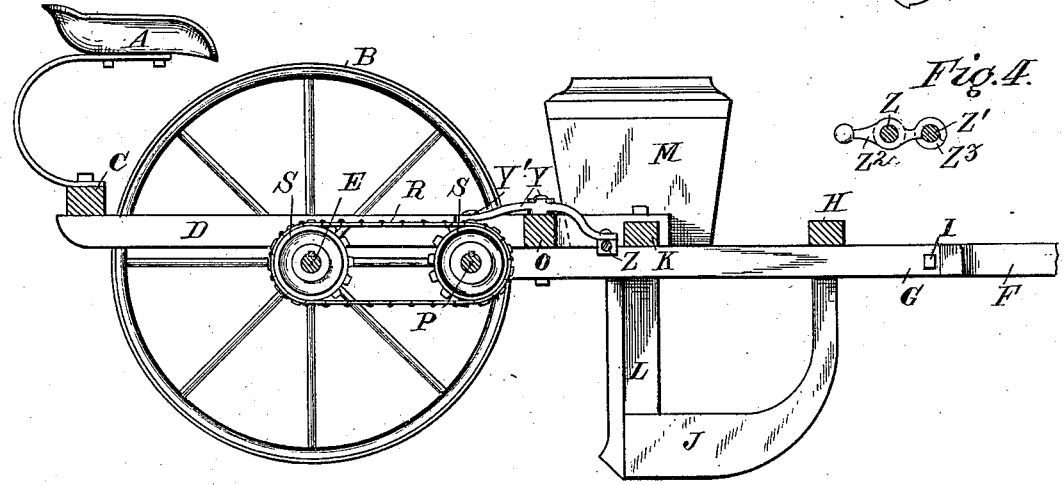

Figure 1 is a plan view of the planter, with parts shown in dotted lines. Fig. 2 is a section thereof through the line 10 10. Fig. 3 is a detail of the dropping mechanism. Fig. 4 is a detail and sectional view of the two shaker-rods and the device for locking them together.

Like parts are indicated by the same letter in all the figures.

A is the seat; B B, the wheels; C, the rear cross-piece of the frame; D D, the longitudinal pieces; E, the axle; F, the tongue; G G, longitudinal pieces which support the forward cross-piece, H, and by a transverse bolt, I, also support the tongue.

J J are shoes which open the furrow to receive the grain.

K is a cross-piece which is secured to the pieces G G, and from which depends the chute L—one for each grain-box M M and one for the auxiliary box N. The box N has no shoe or plow.

O is a cross-piece which rests on the cross-pieces G G, and carries a pivot for the lever Y.

P is a short shaft journaled on the rear ends of the pieces G G.

R is a link-belt passing over the sprocket-wheels S, secured, respectively, on the axle E and shaft P.

T is a sliding clutch pressed against the loose wheel S by the spring U. The clutch is connected with and may be controlled by the foot-lever V.

W is a wheel on the outer end of the shaft P, provided on its periphery with the cam groove or way X, in which travels the pin $Y'$ on the end of the lever Y.

Z is a shaker-rod, to which the other end of the lever Y is attached.

$Z'$ is a second shaker-rod, carrying the collars $Z^3$.

$Z^2$ is a foot-lever pivoted on the rod Z, and adapted to engage the rod $Z'$ between the collars $Z^3$.

$A'$ is a hand-wheel on the shaft P.

$A^2$ is a sliding bolt, with foot-piece $A^3$, adapted to engage slot $A^4$ on the hub, and thus lock the wheel rigid on the axle.

The use and operation of my invention are as follows:

The shoes or plows J J form furrows, into which the grain falls from the chute L. The concave periphery of the wheel B passes over such furrow and covers the corn completely. When the operator again passes over the field in the usual manner, he cannot distinguish the places where the grain was dropped, and hence cannot know whether the planter is so dropping as to make right-line transverse rows. To obviate this difficulty I provide the central box, N, which carries a chute, L, but no shoe or plow. The dropping is accomplished in any of the many ways now in use, and so I have shown no detail thereof. However, I have adapted my improvement to that class of planters where the dropping is effected by the reciprocation of a transverse bar which operates a ratchet-wheel, as shown in Fig. 3. The wheels are secured on the axle E, which is a continuous metal axle, so that they can be locked rigid therewith or be loose thereon, by means of the bolts $A^2$ $A^2$. As the wheels and axle turn in crossing the field the loose wheel S, if locked to the axle by the clutch T, rotates and drives the link-belt R, the other wheel S, the shaft P, and the wheel W. By this means the lever Y is rocked and the shaft Z reciprocated. The size of these various parts can be so adjusted with reference to each other that the reciprocations of the bar Z will take place at such intervals as will place the hills of grain the proper distance apart. If the clutch T is thrown back and it is desired to move the bar Z, it can be done by rotating the hand-wheel $A'$. Now the operator puts in box N a quantity of bad corn or light-colored fertilizer. When the machine starts across the field, he throws the lever $Z^2$ into the position shown in Fig. 4, and a quantity of fertilizer or bad corn is dropped on top of the ground, but in a line with the transverse rows. This he can repeat from time to time across the field, keeping the lever $Z^2$ up and the rod Z' idle most of the time. When on the return trip across the field he reaches the visible transverse row, he throws the rod Z' into operation, and can immediately determine whether the transverse row is being properly formed. Should it be out of line he can back his planter until it comes properly into line.

The parts of the planter are such as are commonly used, except the devices for operating the shaker-rods and the auxiliary box N and its rod Z', to which parts my improvements particularly relate.

I claim—

In a corn-planter, the combination of wheels B B, axle E, clutch T, with lever V, sprockets S and S, with link-chain R, shaft P, having the hand-wheel A' and the cam-grooved wheel W, the seed-boxes M M, the reciprocating shaker-rod Z, and lever and pin Y Y', and auxiliary dropping-box N, without a shoe, and the lever $Z^2$, to connect the two shaker-rods Z and Z', all combined as and for the purpose shown.

In testimony whereof I have hereunto set my hand, this 21st day of August, A. D. 1886, in the presence of two witnesses.

KENDALL JACKMAN.

Witnesses:
FRANCIS W. PARKER,
G. G. JACKSON.